United States Patent
Walker et al.

(10) Patent No.: US 9,460,462 B1
(45) Date of Patent: *Oct. 4, 2016

(54) MONETIZATION USING VIDEO-BASED SIMULATION OF COSMETIC PRODUCTS

(71) Applicant: Image Metrics Limited, Manchester (GB)

(72) Inventors: Kevin Walker, Sheffield (GB); Michael Rogers, Manchester (GB); Tomos G. Williams, Wales (GB); Salil Deena, Manchester (GB)

(73) Assignee: Image Metrics Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,469

(22) Filed: Aug. 27, 2014

Related U.S. Application Data

(63) Continuation-in-part of application No. 14/470,180, filed on Aug. 27, 2014, which is a continuation-in-part of application No. 14/019,748, filed on Sep. 6, 2013, now Pat. No. 9,104,908, and a continuation-in-part of application No. 13/795,882, filed on Mar. 12, 2013, now Pat. No. 9,111,134.

(60) Provisional application No. 61/650,262, filed on May 22, 2012, provisional application No. 61/884,349, filed on Sep. 30, 2013, provisional application No. 61/874,506, filed on Sep. 6, 2013.

(51) Int. Cl.
*G06T 11/60* (2006.01)
*G06Q 30/06* (2012.01)

(52) U.S. Cl.
CPC ...... *G06Q 30/0623* (2013.01); *G06Q 30/0641* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,659,625 A | 8/1997 | Marquardt | 382/118 |
| 5,854,850 A | 12/1998 | Linford et al. | 382/128 |
| 5,933,527 A | 8/1999 | Ishikawa | 382/190 |
| 6,091,836 A | 7/2000 | Takano et al. | 382/118 |
| 6,396,599 B1 | 5/2002 | Patton et al. | 359/1.9 |
| 6,502,583 B1 | 1/2003 | Utsugi | 132/200 |

(Continued)

OTHER PUBLICATIONS

Cham et al., "A Multiple Hypothesis Approach to Figure Tracking," *Compaq Computer Corporation*, Cambridge Research Laboratory, Technical Report Series, CRL 98/8, 16 pages. (Jul. 1998).

Chen et al., "Mode-based Multi-Hypothesis Head Tracking Using Parametric Contours," *In Proc. Autom. Face Gesture Recognition*, 6 pages (May 2002).

(Continued)

*Primary Examiner* — Jon Chang
(74) *Attorney, Agent, or Firm* — Sunstein Kann Murphy & Timbers LLP

(57) ABSTRACT

Computer-implemented methods for vending at least one cosmetic product to a first consumer. A real-time image of a portion of a body of the consumer is captured using a personal computational device and the consumer provides a desired makeup look via the personal computational device. The desired makeup look is then applied to an image of the portion of the body of the consumer, thereby generating a composite image of the portion of the body of the first consumer with the desired makeup look, and a retail order for the cosmetic product is received from the consumer. The order may be received before or after the consumer's image is captured. Another consumer, or a product specialist, may be involved in the aforesaid process via a computer communications link.

21 Claims, 9 Drawing Sheets

(56) References Cited

U.S. PATENT DOCUMENTS

| | | | |
|---|---|---|---|
| 6,719,565 B1 | 4/2004 | Saita et al. ............... 434/94 |
| 7,099,510 B2 | 8/2006 | Jones et al. .............. 382/225 |
| 7,612,794 B2 | 11/2009 | He et al. .................. 348/14.08 |
| 7,619,638 B2 | 11/2009 | Walker, Jr. et al. ........ 345/269 |
| 7,634,103 B2 | 12/2009 | Rubinstenn et al. ........ 382/100 |
| 7,916,904 B2 | 3/2011 | Suzuki et al. ............. 382/118 |
| 8,064,648 B2 | 11/2011 | Takano et al. ............. 382/117 |
| 8,082,926 B2 | 12/2011 | Yano et al. ................ 132/200 |
| 8,107,672 B2 | 1/2012 | Goto ........................ 382/100 |
| 8,498,456 B2 | 7/2013 | Legagneur et al. ......... 382/118 |
| 9,058,765 B1* | 6/2015 | Mallick .................. G06F 3/0482 |
| 2002/0071604 A1* | 6/2002 | Orpaz .................. A45D 44/005 382/162 |
| 2003/0065589 A1* | 4/2003 | Giacchetti ............ A45D 44/005 705/26.1 |
| 2009/0234716 A1* | 9/2009 | Mallick ................ G06F 3/0482 705/14.54 |
| 2010/0189357 A1* | 7/2010 | Robin ................... G06T 11/001 382/195 |
| 2010/0271368 A1 | 10/2010 | McNamara et al. ......... 345/420 |
| 2011/0110561 A1 | 5/2011 | Havaldar ................... 382/103 |
| 2012/0044335 A1* | 2/2012 | Goto ..................... A45D 44/005 348/77 |
| 2013/0159895 A1* | 6/2013 | Aarabi .................. G06Q 30/00 715/764 |
| 2013/0179298 A1* | 7/2013 | Segman ................ G06F 19/3456 705/26.7 |
| 2014/0032331 A1* | 1/2014 | Blanch ................ G06Q 30/0269 705/14.66 |

OTHER PUBLICATIONS

Cootes et al., "Active Appearance Models," *Proc. European Conference on Computer Vision*, vol. 2, pp. 484-498 (Jun. 1998).

Gao et al., "A Review of Active Appearance Models," *IEEE Trans. Syst. Man Cybern. C Appl. Rev.*, vol. 40, No. 2, pp. 145-158 (Mar. 2010).

Horn et al., "Determining Optical Flow," *Massachusetts Institute of Technology, Artificial Intelligence Laboratory*, A.I. Memo No. 572, 28 pages (Apr. 1980).

Liao et al., "Learning Multi-scale Block Local Binary Patterns for Face Recognition," *Center for Biometrics and Security Research & National Laboratory of Pattern Recognition, Institute of Automation, Chinese Academy of Sciences*, pp. 828-837 (2007).

Prabhu et al., "Automatic Facial Landmark Tracking in Video Sequences using Kalman Filter Assisted Active Shape Models," *ECCV '10 Proceedings of the 11th European Conference on Trends and Topics in Computer Vision*—vol. Part I, 14 pages (2010).

Viola et al., "Robust Real-time Object Detection," *2nd International Workshop on Statistical and Computational Theories of Vision—Modeling, Learning, Computing, and Sampling*, 25 pages (Jul. 2001).

\* cited by examiner

MONETIZATION USING VIDEO-BASED SIMULATION OF COSMETIC PRODUCTS

The present Application is a continuation in part of U.S. Ser. No. 14/470,180, filed Aug. 27, 2014, and, through that application, claims the priority of U.S. Ser. No. 14/019,748, U.S. Ser. No. 13/792,882, and U.S. Provisional Application Ser. No. 61/650,262, filed May 22, 2012, and Provisional Patent Application Ser. No. 61/874,506, filed Sep. 6, 2013. Moreover, the present Application also claims the priority of US Provisional Patent Application Ser. No. 61/884,349, filed Sep. 30, 2013. All of the foregoing applications are incorporated herein by reference.

TECHNICAL FIELD

The present invention relates to the use of real time video simulation technologies for the monetization of cosmetics.

BACKGROUND

The traditional process of selling cosmetics products[1] involves customers visiting makeup retail shops, requesting samples of cosmetics, which they, then, apply to assess the feel and look of the cosmetics on their face, hands or other parts of their bodies. This process is cumbersome for cosmetics retailers and customers alike. Cosmetics retailers must go to the expense of providing product samples and dedicated staff to apply them to customers. As the application and removal of cosmetics is time consuming, customers are limited in the number of samples they can physically try on in order to assess their suitability. It would be desirable, therefore, for there to be a system whereby customers might simulate the appearance of cosmetics on their bodies using a personal computation device fitted with a camera and screen.

[1] No distinction is made among the terms "makeup," "cosmetics," "makeup cosmetics," and "cosmetic products," all of which are used interchangeably herein.

While, for heuristic convenience, the present application may refer to makeup and its application to the face, it is to be understood that the teachings herein apply in equal measure to any cosmetic product applied to any body part. Similarly, references to 'makeup' subsume other cosmetic product such as nail varnish, skin tanning lotion, permanent makeup and tattoos.

It would be particularly desirable for there to be a process for retailing cosmetics digitally, using methods described in copending U.S. Provisional Patent Application Ser. No. 61/874,506, filed Sep. 6, 2013, which is incorporated herein by reference. Similarly, it would be desirable to employ the methods of the Mojo Masks App, described on the Webpage, www.businesswire.com/news/home/20121022006659/en/Image-Metrics-Unwraps-Mojo-Masks-App (Oct. 22, 2012), appended hereto as Appendix A and incorporated herein by reference.

Methods for digital simulation of makeup can be broadly categorized into image-based and video-based techniques. Image-based methods provide single images of a person on which makeup is to be applied and work in an offline mode. Image-based makeup systems include those described in U.S. Pat. No. 6,937,755 "Make-up and fashion accessory display and marketing system and method," which details a method for compositing different makeup products and applying it to an image. Another image-based makeup system is described in U.S. Pat. No. 8,265,351 "Method, system and computer program product for automatic and semi-automatic modification of digital images of faces" where the application of makeup involves combining the original image and the makeup image. The foregoing methods fail to account for the transparency properties of makeup. Both methods only take into account the overall illumination variation in the original image, without making corrections for local illumination variation.

It would thus be desirable to provide real-time video-based makeup simulation in a manner that is adaptive to variations in the position and orientation of the user's face, and, moreover, that accounts for variations in illumination quality.

SUMMARY OF EMBODIMENTS OF THE INVENTION

In accordance with embodiments of the present invention, a computer-implemented method is provided for vending of at least one cosmetic product to a first consumer. The method has steps (not necessarily executed in the listed order) of:
capturing a real-time image of a portion of the body of the first consumer using a personal computational device;
receiving from the first consumer a desired makeup look via the personal computational device;
applying the desired makeup look to an image of the portion of the body of the first consumer of the at least one cosmetic product, thereby generating a composite image of the portion of the body with the desired makeup look; and
receiving from the first consumer a retail order for the at least one cosmetic product.

In accordance with other embodiments of the present invention, the step of receiving a retail order may be performed either before or after applying the desired makeup look to the image. The portion of the body imaged in real time may be the consumer's face, for example. Additionally, further steps may be provided of gathering consumer usage analytics and communicating the consumer usage analytics to a centralized location. The step of applying the makeup look to the image of the portion of the first consumer's body may include adapting the desired makeup look to at least one of a set of image-capture environment parameters and a set of visual characteristics of the first consumer. The image-capture environment parameters may include illumination characteristics. Moreover, the retail makeup product may be physical or virtual.

In accordance with further embodiments of the present invention, the steps of receiving a desired makeup look, applying the desired makeup look to an image, and receiving a retail order may be performed on the basis of a series of instructions embodied in an application running on the personal computational device, or, alternatively or additionally, by execution a series of instructions by a web browser running on the personal computational device. Consumer specification of a makeup product may be received with reference to displayed options, including, for example, a product marked with a machine-readable identifying code or an advertisement marked with a machine-readable identifying code.

In accordance with yet further embodiments of the present invention, communication may be provided between the first consumer and a remotely disposed product specialist concurrent with consideration by the consumer of cosmetic product options. Communication may be provided via a computer communications link, and the product specialist may be compensated, at least in part, based on the retail order of the first consumer.

In accordance with alternate embodiments of the invention, communication may be provided between the first consumer and a remotely disposed second consumer concurrent with consideration by the second consumer of cosmetic product options, and the first consumer may be compensated, at least in part, based on a retail order of the second consumer. A consumer may also be provided with video-based tutorial content concurrently with consideration of cosmetic product options. The provision of video-based tutorial content may include generating a composite image of the face of the consumer with renditions of the cosmetic product options.

BRIEF DESCRIPTION OF THE FIGURES

The foregoing features of the invention will be more readily understood by reference to the following detailed description, taken with reference to the accompanying figures, in which.

DETAILED DESCRIPTION OF REPRESENTATIVE EMBODIMENTS OF THE INVENTION

Definitions

Figure 1:
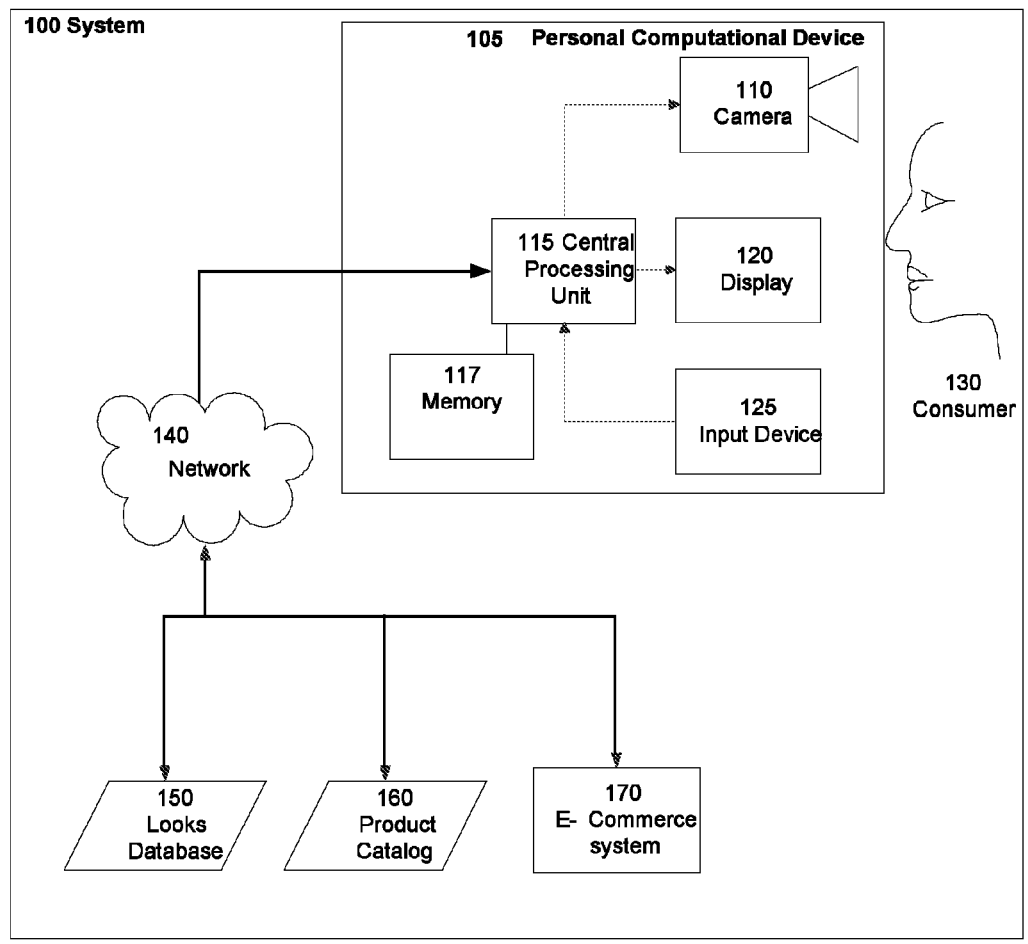
FIG. 1 is a system overview diagram of a method for monetization using video-based virtual makeup and a personal computational device, in accordance with an embodiment of the present invention.

As used herein and in any appended claims, and unless the context requires otherwise, the term "cosmetic product" (or, synonymously, "makeup," or "makeup cosmetic") shall refer to any substance used to modify or enhance the appearance of a person, either permanently or temporarily, as well as to any digital simulacrum thereof used to modify or enhance the appearance of an image of a face of a person. The substantive cosmetic product may be referred to as "physical," whereas the digital simulacrum may be referred to as "virtual."

Throughout this document the term "face" may be referred to as a proxy for any portion of the body of a subject that has a virtual cosmetic product applied. It is to be understood that the use of the term "face" does not limit the scope of the invention to this specific-use-case. The reader should assume that unless otherwise stated, where the subject's face is mentioned other body parts can be used interchangeably and where makeup is used other cosmetic products can also be used interchangeably.

As used herein and in any appended claims, the term "e-commerce system" shall signify any system used for offering, ordering, buying, or selling, products or services over electronic systems such as the Internet or other computer networks.

As used herein and in any appended claims, the term "personal computational device" (PCD) shall designate any electronic product that is normally owned and operated by one person, and that contains a video display, a central processing unit (CPU, typically a microprocessor), an operating system, and local memory, and that may be coupled to a network such as, typically, the internet, wirelessly or via cable. Examples, provided without limitation, include a mobile phone, tablet computer, smart TV, smart TV second screen and a personal computer.

As used in this description and in any appended claims, the term "image" refers to any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as brightness, constitutes an image. So, also, does an array of numbers in a computer memory or holographic medium. Similarly, "imaging" refers to the rendering of a stated physical characteristic in terms of one or more images. An image, when constituting one of a series, may be referred to as a "frame."

As used in this description and in any appended claims, the term "image capture environment parameters" refer to the hardware applied to obtain an image of a consumer in the consumer's environment, thus including, for example, lighting conditions and camera hardware found in a consumer's particular environment.

In accordance with various embodiments of the present invention, an alternative process for retailing makeup digitally is described which advantageously enables a makeup retailer to create digital representations of makeup looks as worn by a customer. Embodiments of the invention may enable customers to access makeup looks through an app on their mobile device and create customized makeup templates and real-time simulation of the makeup templates on their body under different lighting conditions. The customer can choose to buy the makeup represented by the makeup template through the touch of a button and share personalized digital simulations of the makeup template on makeup promotion websites and social networks.

Methods of the present invention may be practiced on various computational devices and provide for retail trial and purchase of makeup products, real or virtual.

First, a representative system is described that may be used for practice of various embodiments.

Monetization Using Video Based Virtual Makeup and a Personal Computational Device A system 100 that may be employed for practice of embodiments of the present invention is first described with reference to FIG. 1. Embodiments discussed here typically relate to the use of a personal computational device using video-based virtual makeup technologies to allow a consumer to try on and purchase makeup products. A monocular video 110 contained within, or connected to, a personal computational device 105, such as a mobile phone, tablet computer, smart TV, smart TV second screen or personal computer, is positioned to capture the face of a consumer 130 for a duration of time that may be referred to herein as a facial performance. Personal computational device 105 contains a central processing unit 115 and memory 117. Memory 117 is capable of storing all of the entities and data of the system. As used herein, the term "data of a system" shall refer to information upon which the system's executable instructions operate, whereas "entities associated with the system" shall refer to persons, natural or otherwise, with which the data are associated.

In certain embodiments of the invention, memory 117 may also contain a program in the form of a series of instructions (hereinafter, "the series of instructions") which, when executed by the central processing unit 115, and applied to the data and entities, allows a consumer to select and simulate makeup products on the images captured by the camera, then communicates with an e-commerce system 170, via a network 140 (typically, the internet), to arrange payment and delivery of the said makeup products. The system is configured so that the video of a consumer 130 is captured by camera and streamed to computational device 105 for processing resulting in a digitally modified video, such that the consumer appears to have the makeup products applied, in real-time. The computational device then displays the digitally modified video on a physical display 120 for the consumer 130 to view. The digitally modified video displayed on physical display 120 may be referred to herein as a "makeup simulation." Finally the computational device 105 allows consumer 130 to purchase products through the use of an e-commerce system 170. In another embodiment of the invention, an Input Device 125 is used by the consumer 130 to set parameters which modify the output of the makeup simulation, for example, selecting a different makeup product, choosing a method of application or entering a before-and-after viewing mode. Input device 125 may be a touch screen, keyboard, pointing device, or any other input device capable of capturing this information.

In one embodiment of the invention, the series of instructions takes the form of an application running on personal computation device 105. In other embodiments, the series of instructions may also be executed from within a web browser which is, itself, running on the personal computational device 105. All methods of executing instructions within a web browser are within the scope of this invention.

Several methods whereby video-based virtual makeup technologies are used to monetize physical makeup products are now described below with reference to FIGS. 2 and 3. In summary, the Purchase Makeup module 220 allows a consumer to use video-based virtual try-on technology to try on cosmetics contained within a product catalogue and to purchase the physical or virtual versions of the products if so desired.

Purchase Makeup module 220 uses Update Product Catalogue 230 for obtaining the latest product information. Next, a Try on Makeup module 240 allows the consumer to select products, specifying details of how they should be applied, and uses video-based virtual makeup technology to try the makeup on. Video-based virtual makeup technology is described in pending U.S. patent application Ser. No. 14/470,180 (the "Adaptive Calibrated Makeup Simulation Application"), filed Aug. 27, 2014, and in other patent applications referenced therein, all of which are incorporated herein by reference.

Consumers can use Add Makeup Products to Shopping Cart 250 to record products they wish to purchase whilst trying on further products 260. Finally, Complete Purchase module 270 allows the consumer to review the products in the shopping cart and complete the purchase resulting in an electronic exchange of funds and the physical products being shipped to an address of the consumer's choosing. Methods of implementing the shopping cart and e-commerce modules are standard and widely known in the art.

Figure 3:
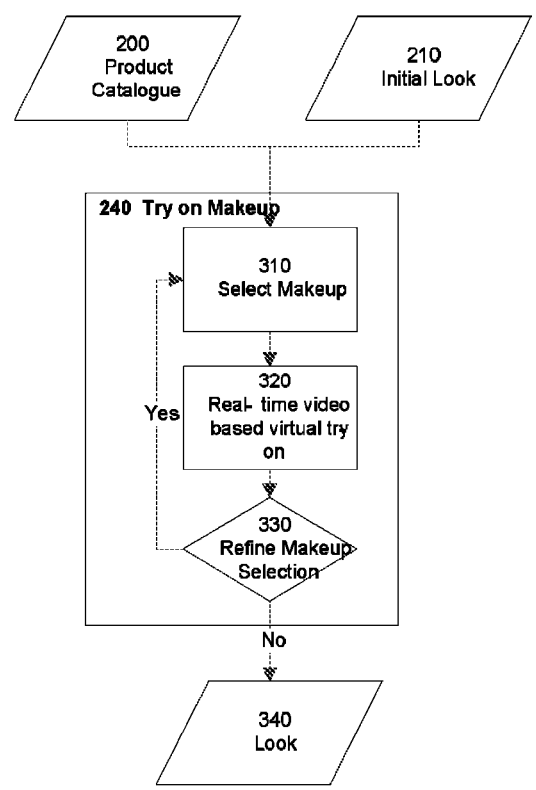
FIG. 3 is a flowchart for trying on a look, in accordance with an embodiment of the present invention.

FIG. 3 provides a detailed view of the Try-on Makeup module. Select Makeup 310 allows the consumer to choose the products they wish to try on. The real-time video-based virtual try-on module 320 digitally modifies the consumer's appearance in images of the consumer captured from the computational device's camera 110 (shown in FIG. 1) to give the impression that they are wearing the selected makeup products. The modified images are displayed, in real time, to the consumer. The consumer can refine their makeup choices, thus changing the displayed image, until they obtain the desired, or a pleasing, look.

Figure 2:
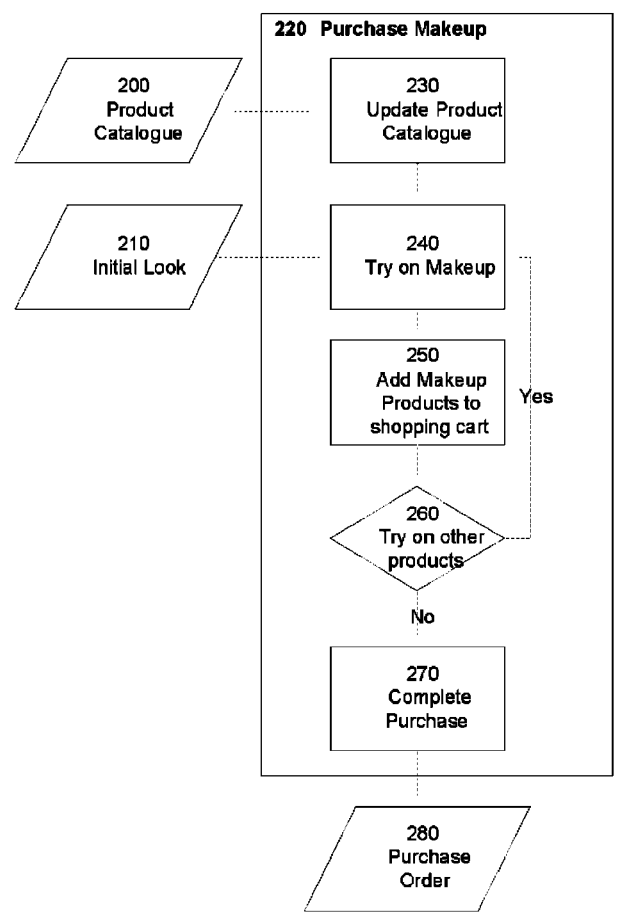
FIG. 2 is a flowchart of a method for purchasing makeup, in accordance with an embodiment of the present invention.

Detailed descriptions of the modules summarized above with respect to FIGS. 2 and 3 are now provided.

Update Product Catalogue 230, allows the most recent product catalogue to be obtained from a specified remote location. The latest product catalogue may be cached locally on the device allowing subsequence modules to access the information quickly and allowing the system to continue to operate if network communication is not available. In one embodiment, the product catalogue is retrieved from a remote server via the internet. The product catalogue contains the information on each makeup product required by the Real-time video based virtual try-on module to digitally modify an image such that the person in it appears to have the product applied. One embodiment of this invention uses teachings of the '506 Provisional Application for Real-time Video-based Try-on Module 320, and the "Look Texture" described in pars. [0075]ff of the Adaptive Calibrated Makeup Simulation Application is an example of this information. The product catalogue may optionally contain additional information relating to each product; including but not limited to the product name, marketing images, product description and pricing.

Select Makeup 310 allows the consumer to choose one or more makeup products that they wish to try on. This might include choosing various other makeup options with might affect the appearance of the makeup or the way in which it is applied. Example makeup options include but are not limited to:

region of application;
color;
method of application; and
viewing mode. For example, a mode that only applies the virtual makeup on half of the consumer's face, thereby allowing the consumer to compare their appearance of multiple makeup products, or their appearance with and without the makeup products.

One or more Makeup Products together with an associated set of makeup options for each product is referred to herein as a "Look" 340. In one embodiment of the invention, a predefined Look is used, referred to herein as the initial look 210. In an alternative embodiment, a predefined selection of Looks is offered to the consumer. Once the customer has selected a look, the Real-time video based Virtual Try-on module is used to simulate the Look on images of the customer obtained from the personal computational device's camera. Preferred methods of Real-time video based Virtual try-on are described in the '506 Provisional Application and the '748 Application. The methods described therein are to be preferred in that, unlike other methods, they provide real-time makeup simulations on mobile devices that attain the high level of realism necessary for retailing physical makeup products. Other methods in the prior art that are based on single images; are too computationally expensive to operate in real time on a mobile device, fail to provide a sufficiently realistic simulation to be of use when selecting an appropriate makeup product, or aren't sufficiently robust to deal with the high degree variation in lighting conditions and camera hardware found in consumer environments. The stream of simulated look images are displayed on the computational device's display for the consumer to view, allowing the consumer to assess if the makeup products, if purchased, could be used to create the desired or a pleasing effect.

The Refine Makeup Selection Decision 330 allows the customer to try on different products or change the makeup options from the set selected by Select Makeup 310. In one embodiment of the invention, this cycle of modifying, and then trying on, the Look can happen interactively in real-time, resulting in the consumer seeing the changes instantly, without interruption to the displayed video stream. In this embodiment, it is possible, but not necessary, for some makeup options, such as the region of application, to be set directly by using a touch screen to paint regions on the video stream.

At any point during the makeup simulation the consumer can indicate makeup products they intend to purchase. Intended purchases are preferably indicated through the use of a shopping cart, as routinely practiced in the world of e-commerce for selecting items for eventual purchase via an application or internet site. The consumer may then continue to try on different makeup products adding selected items to the shopping cart as and when they require. Once the consumer has finished, the consumer may complete the transaction by checking out. Depending on the e-commerce system being used, the software typically calculates a total for the order, including shipping and handling charges and associated taxes, as applicable.

Consumer usage information, herein known as usage analytics can be accumulated by the system and communicated to a centralized location for use by the makeup retailers or manufacturers. These usage analytics can then be used by the manufacturers and retailers to maximize monetization by modifying the product catalogue by refining their product range, refining how products are presented or learning which products are preferred by specific consumer groups. Usage analytics can include but are not limited to:
  Which makeups were tried on;
  Which makeups were not tried on;
  How long a product was tried on for;
  Which products are popular with which skin types, age groups or other consumer demographics;
  Which products tend to get purchased together;
  Which products are tried on but not purchased.

Monetization Using Video-Based Virtual Makeup and Product Recognition

Figure 4:
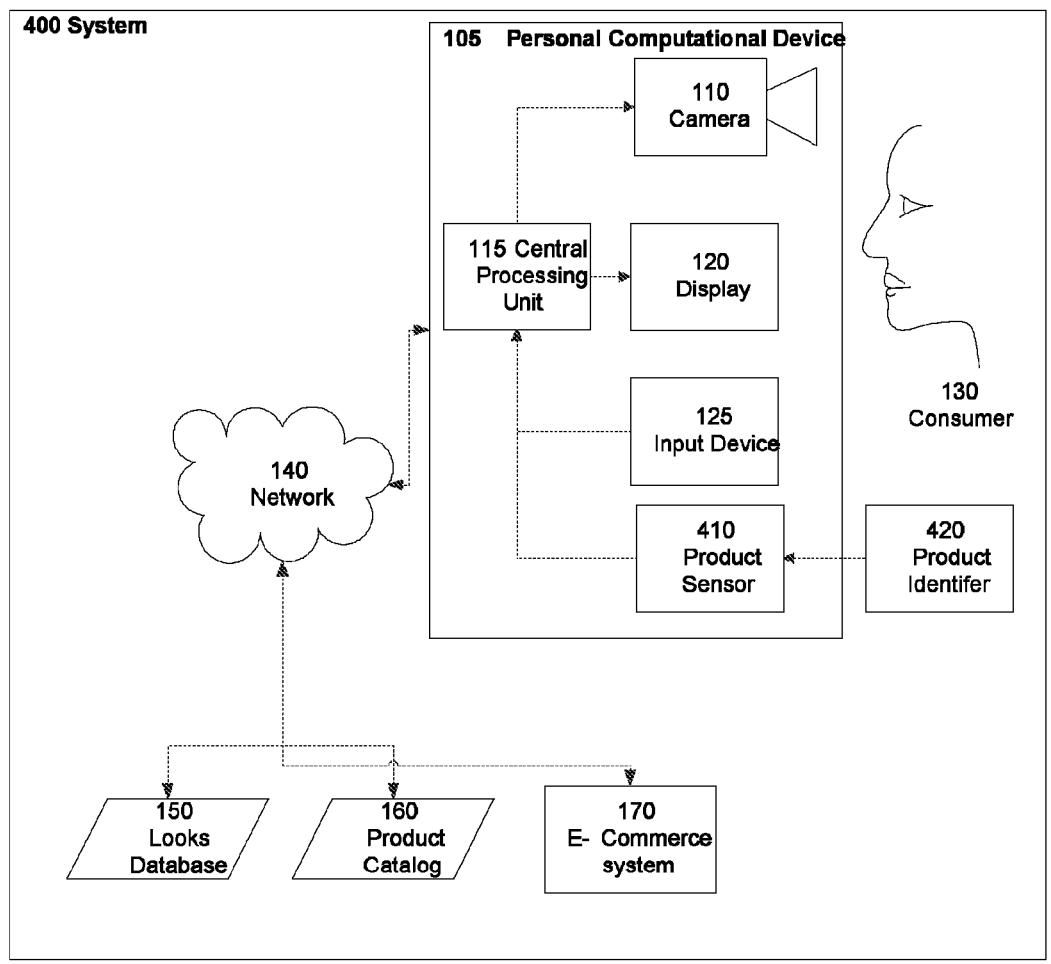
FIG. 4 depicts a system overview of monetization using video based virtual makeup and product recognition, in accordance with an embodiment of the present invention.

A system 400 that may be employed for practice of embodiments of the present invention is first described with reference to FIG. 4. The embodiments discussed here, relate to the use of a personal computational device 105 using video-based virtual makeup technologies to allow a consumer to try on and purchase makeup products featured in advertisements, product packaging, images, videos or other media associated with or representing the product. This system builds upon the system described above 100 and adds a Product Sensor 410 to the personal computational device 105. This sensor is used to read a product identifier 420 embedded in an advertisement for a makeup product or products. The product identifier and sensor are not limited as to the forms they might take, and all product identifiers and sensors used in the manner described herein are within the scope of the present invention. Examples include, but aren't limited to, using the camera to read a visual cue in an advertisement such as a Quick Response (QR) code adhering to prevailing standards, or otherwise, or using wireless technology to transmit the product identifier from the advertisement to the personal computational device.

Figure 5:
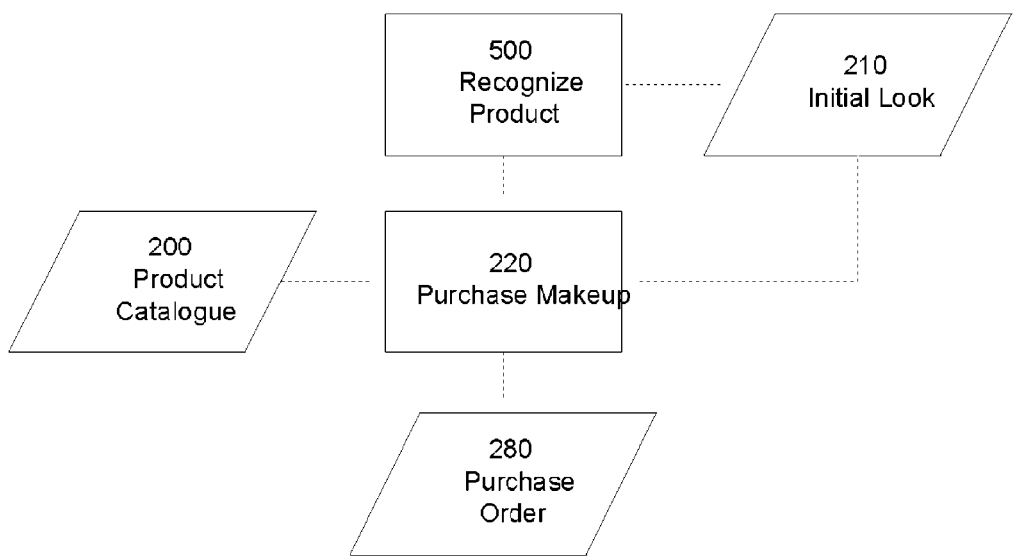
FIG. 5 is a flowchart illustrating monetization using video based virtual makeup and product recognition, in accordance with an embodiment of the present invention.

Methods for use of video-based virtual makeup technologies to monetize physical makeup products using product recognition are now described with reference to FIG. 5. To summarize these embodiments, a product identifier is embedded within any media that represents or is associated with a makeup product or collection of makeup products. This media could be but is not limited to an advert for the product, in a magazine or on a billboard, an image of someone with the product applied, the products packaging, in-store displays or content broadcast to or displayed upon a television. Recognize Product module 500 allows the consumer to use the personal computational device to read the product identifier from the said media. Purchase Makeup module 220, obtains the product catalogue 200 for the product or products identified by the product identifier. Optionally the product catalogue is obtained for products related to the ones identified. The real-time video based virtual try-on module takes the images of the consumer captured from the computational device's camera and digitally modifies the consumer's appearance such that they appear to be wearing the identified makeup products. The modified images are displayed, in real time, to the consumer. The consumer can refine their makeup choices and add chosen products to a shopping cart. Finally the consumer can review the products in the shopping cart and complete the purchase resulting in an electronic exchange of funds and the physical products being shipped to an address of the consumers choosing. A detailed description of the modules in this embodiment can be found above.

Figure 6:
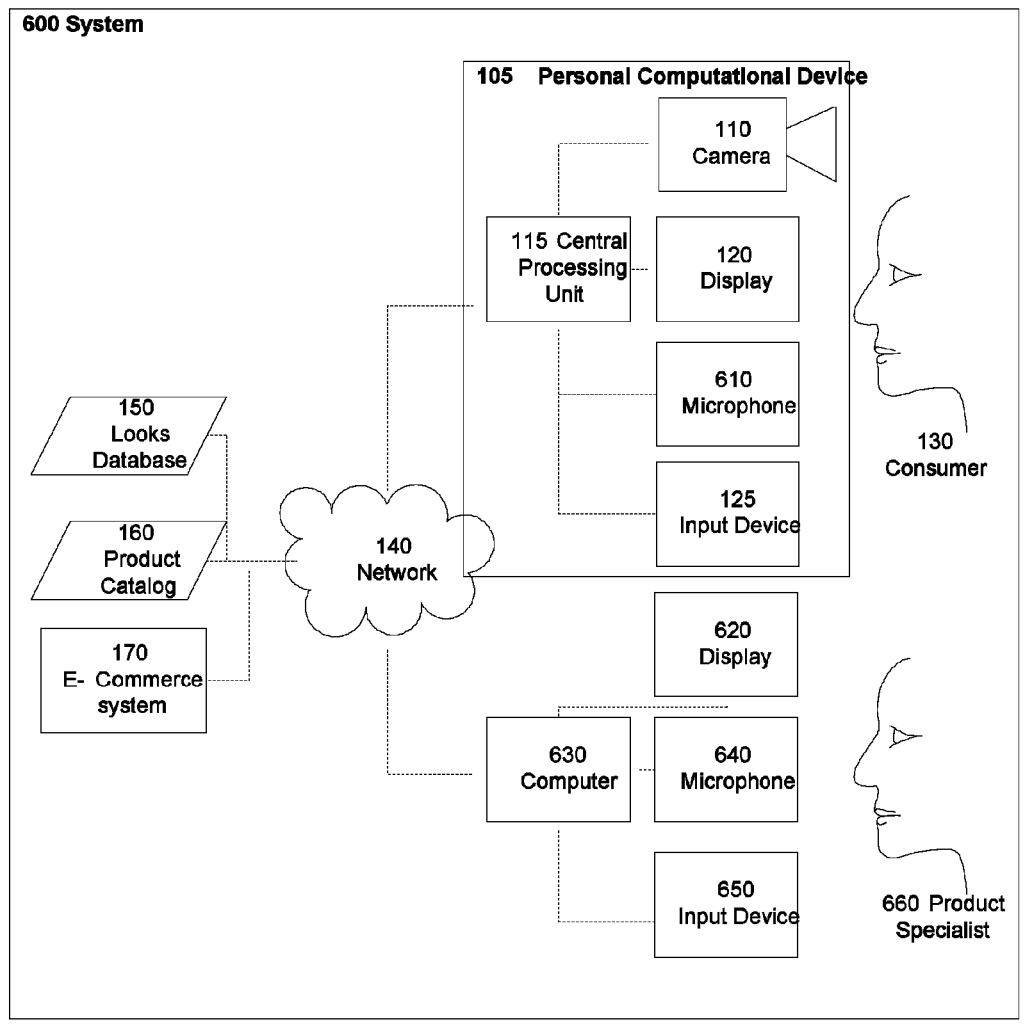
FIG. 6 shows a system overview of monetization using video based virtual makeup combined with remote product specialist advice, in accordance with an embodiment of the present invention.

Monetization Using Video Based Virtual Makeup Combined with Remote Product Specialist Advice A system 600 that may be employed for practice of embodiments of the present invention is first described with reference to FIG. 6. The embodiments discussed here, relate to the use of a personal computational device 105 using video-based virtual makeup technologies, as discussed above, to allow a consumer 130 to try on and purchase makeup products, selected on behalf of the consumer, interactively, by a product specialist located in a geographic location that is typically distinct from that of consumer 130. System 600 augments system 100 by enabling a Product Specialist 660 to communicate and interact with consumer 130, located in a potentially different geographic location, using a computer communication link. The Products Specialist's computer 630 contains a central processing unit and memory (not shown). The memory of the Products Specialist's computer 630 is preferably capable of storing all of the entities and data of the system. The memory also contains a program in the form of a series of instructions which, when executed by the central processing unit, and applied to the data and entities, allows the product specialist to initiate or answer a call with a consumer via the consumers personal computational device and remotely control which virtual makeup products the consumer sees applied to the real-time video captured of the consumers face. Optionally, the series of instructions also allow the Product Specialist 660 to interact with an e-commerce system, allowing them to arrange payment and shipping of products purchased by the consumer. Optionally, both the personal computational device 105 and the Products Specialist's computer 630 have a connected microphone 610 and 640, thereby allowing the consumer and the Product Specialist to converse via an audio connection, for example, using voice over IP. Optionally, a one-way or two-way video may accompany the audio.

Figure 7:
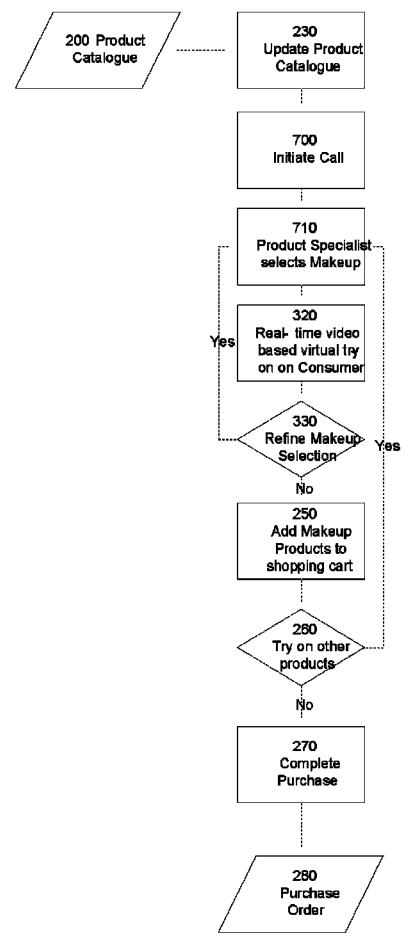
FIG. 7 is a flowchart for monetization using video based virtual makeup combined with remote product specialist advice, in accordance with an embodiment of the present invention.

Methods describing how video-based virtual makeup technologies combined with advice from a remote product specialist are used to monetize physical makeup products are described below with reference to FIG. 7. The following summarizes this embodiment. First, Update Product Catalogue 230 ensures that both the consumer's personal computational device and the product specialist's computer obtain the latest product catalogue. Initiate call 700 allows either the consumer or the product specialist to initiate a communication link allowing them the converse with each other. The conversation that follows, together with optional images or video of the consumer uploaded to the product specialist's computer for display, provide the product specialist with the information required to make an informed selection of makeup products for the consumer to try on. This process of selecting makeup is represented by module 710. The real-time video based virtual try-on module takes the images of the consumer captured from the computational device's camera and digitally modifies the consumer's appearance such that they appear to be wearing the makeup products selected by the makeup specialist. The modified images are displayed, in real time, to the consumer. The product specialist and consumer can continue to discuss and refine the makeup products selected and interactively try-on different configurations until the consumer decides which, if any, products they wish to purchase. In this embodiment, various purchasing methods are included within the scope of the invention. These include but are not limited to the consumer using e-commerce as described above, or the Product Specialist obtaining the necessary shipping and payment details verbally and completing the purchase by interacting with an e-commerce system on their computer.

In a similar embodiment, the product specialist may be replaced by a pre-recorded audio or video based tutorial created by the product specialist. This tutorial provides consumer advice such as information on a range of products or product application advice. As the tutorial is played, the real-time video based virtual try-on module is used to demonstrate to the consumer how the various makeup products would look if applied to their faces.

Monetization Using Video-Based Virtual Makeup by Sharing Looks

Figure 8:
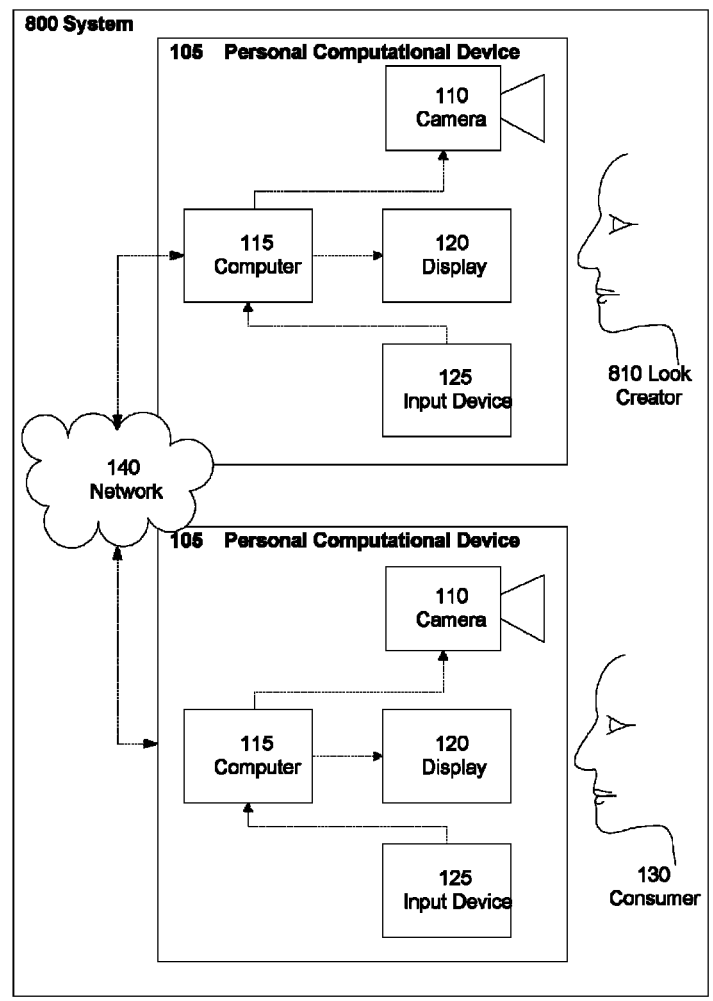
FIG. 8 shows a system overview of monetization using video based virtual makeup by sharing looks, in accordance with an embodiment of the present invention.

A system 800 that may be employed for practice of embodiments of the present invention is first described with reference to FIG. 8. The embodiments discussed here, relate to the use of a personal computational device using video-based virtual makeup technologies to allow a user, herein known as the Look Creator 810, to design a Look 340 by selecting a set of makeup products and associated makeup options (as described above), sharing the Look so that it is exposed to consumers in such a way that the consumer can try on and purchase makeup products contained within the look. The Look Creator might be but is not limited to being a celebrity, a home user, a corporate user or a blogger. This system builds upon the system described above 100 by adding a Look Creator with a personal computational device 105 connected to the internet, located in an arbitrary geographic location with respect the consumer. The Look Creator's computer contains a central processing unit and memory. The memory is capable of storing all of the entities and data of the system. The memory also contains a program in the form of a series of instructions which, when executed by the central processing unit, and applied to the data and entities, allows the look creator to execute the try on makeup module 240 with additional instructions allowing saving and sharing of saved looks via the internet for other consumers to discover and try on 910 and 920. The consumer's personal computation device 150 also contains a central processing unit and memory. The memory is capable of storing all of the entities and data of the system. The memory also contains a program in the form of a series of instructions which, when executed by the central processing unit, and applied to the data and entities, would allow the consumer to discover and download the shared look, use the said shared look as the initial look within the Purchase Makeup module and provide the necessary information to allow a commission to be paid from the retailer or manufacturer of the makeup products being sold to the Look Creator.

Figure 9:
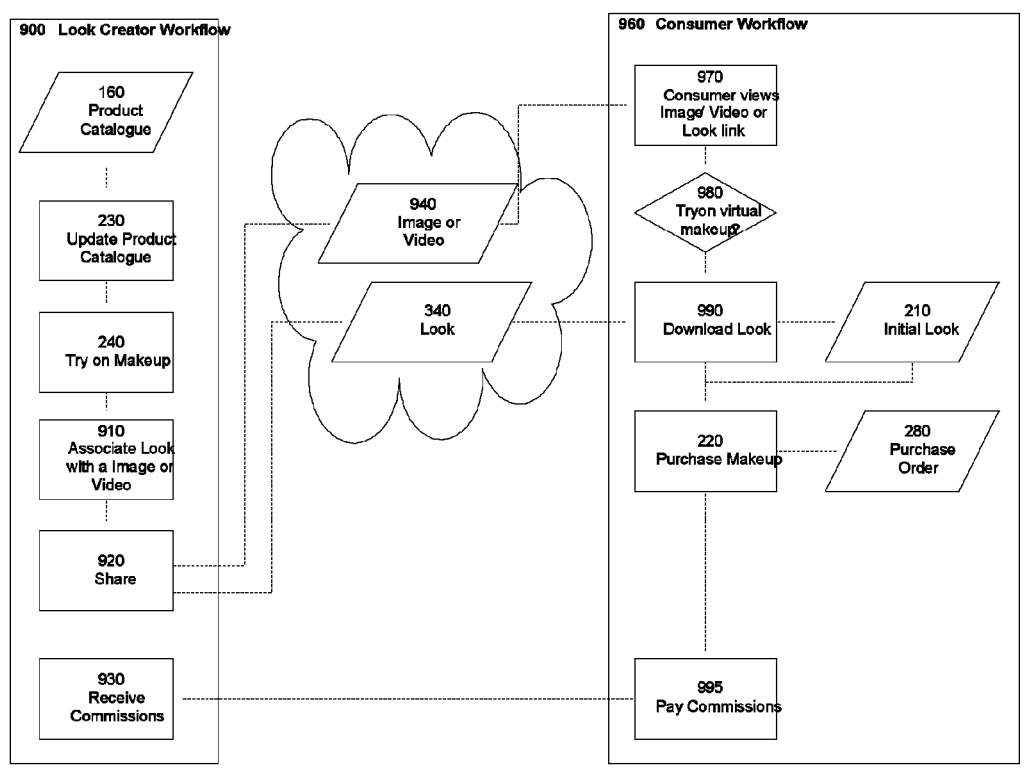
FIG. 9 is a flowchart illustrating monetization using video-based virtual makeup by sharing looks, in accordance with an embodiment of the present invention.

Methods describing how video-based virtual makeup technologies are used to monetize physical makeup products by sharing looks on the internet are described below with reference to FIG. 9. The following summarizes this embodiment and describes in detail modules not previously described. First, the Update Product Catalogue 230 is used to ensure the product catalogue is up-to-date. Try on Makeup 240 is used by the look creator to create a look from makeup products found in the updated product catalog. Module 910 then optionally allows the Look to be associated with an image or video 940. The image or video is likely to contain something that the look can be associated with such as a person with the same physical makeup as contained within the look applied or a marketing picture of the products such as an advertisement or an image of the product packaging. The Share module 920 enables the look creator to share the look, associated images and video with other consumers via the internet.

Consumers then discover the images or videos associated with the look or the look itself. Many methods of discovery exist, all of which are within the scope of this invention. Example methods of how the Look could be discovered include but are not limited to:

- The associated image, video or a link to the image, video or look appears on a website.
- The associated image, video or a link to the image, video or look is emailed, sent via text message or any other electronic messaging system to the consumer.
- The associated image, video or a link to the image, video or look is shared via a social network.

The Look can be associated with an image or video using any method, all of which are in the scope of this invention. Example methods include but are not limited to:

- Encoding a look identifier in the image or videos pixel information such as a watermark or other
- Encoding the look identifier in the image of video files meta data such as the EXIF field
- Using a file or directory naming convention to identify associated files
- An accompanying URL to the look displayed near to the image Once the consumer has discovered the existence of the look and they decide the try on the products it represents using virtual makeup, Download Look 990 allows a local copy of the look to be obtained. The Look is downloaded via an internet connection storing it in any available local storage as the initial look 210 for use within the Purchase Makeup 220.

Pay Commissions module 995 and Receive Commissions module 930 implement a method of providing the Look creator with a commission from the manufacturer or retainer of the Makeup Products contained within the purchase order 280. All systems and methods of providing commissions are encompassed within the scope of this invention. Providing commissions is optional.

One or more portions of any computer system described herein may be distributed across one or more computer systems (not shown) coupled to a communications network. These computer systems may, in some cases, be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate, or interpreted code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention.

Moreover, where examples presented herein involve specific combinations of method acts or system elements, it should be understood that those acts and those elements may be combined in other ways to accomplish the same objective of monetization using video based virtual makeup. In particular, process steps may be performed in a temporal order other than that in which they are recited in specific claims. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Additionally, single device features may fulfill the requirements of separately recited elements of a claim.

What is claimed is:

1. A computer-implemented method for vending of at least one cosmetic product to a first consumer, the method comprising:

capturing a real-time image of a portion of a body of the first consumer using a personal computational device under unconstrained image-capture environment conditions;

receiving from the first consumer a desired makeup look via the personal computational device;

applying the desired makeup look to the real-time image of the portion of the body of the first consumer of the at least one cosmetic product, and applying pixel-wise intensity adjustment to obtain an adapted makeup look for image-capture environment conditions under which the real-time image is being captured, thereby generating a composite image of the portion of the body of the first consumer with the desired makeup look; and receiving from the first consumer a retail order for the at least one cosmetic product.

2. A computer-implemented method in accordance with claim 1, wherein the step of receiving a retail order is performed after the step of capturing a real-time image.

3. A computer-implemented method in accordance with claim 1, wherein the step of receiving a retail order is performed prior to the step of capturing a real-time image.

4. A computer-implemented method in accordance with claim 1, wherein the portion of the body of the first consumer is a face.

5. A computer-implemented vending method in accordance with claim 1, further comprising gathering consumer usage analytics and communicating the consumer usage analytics to a centralised location.

6. A computer-implemented vending method in accordance with claim 1, wherein applying the makeup look to the image of the of a portion of the body of the first consumer further comprises adapting the desired makeup look to at least one of a set of image-capture environment parameters and a set of visual characteristics of the first consumer.

7. A computer-implemented vending method in accordance with claim 6, wherein the set of image-capture environment parameters includes illumination characteristics.

8. A computer-implemented vending method in accordance with claim 1, wherein the retail makeup product is physical.

9. A computer-implemented vending method in accordance with claim 1, wherein the retail makeup product is virtual.

10. A computer-implemented vending method in accordance with claim 1, wherein the steps of receiving a desired makeup look, applying the desired makeup look to an image, and receiving a retail order are performed on the basis of a series of instructions embodied in an application running on the personal computational device.

11. A computer-implemented vending method in accordance with claim 1, wherein the steps of receiving a desired makeup look, applying the desired makeup look to an image, and receiving a retail order are performed by execution a series of instructions by a web browser running on the personal computational device.

12. A computer-implemented vending method in accordance with claim 1, further comprising receiving consumer specification of a makeup product with reference to displayed options.

13. A computer-implemented vending method in accordance with claim 12, wherein the displayed options include a product marked with a machine-readable identifying code.

14. A computer-implemented vending method in accordance with claim 12, wherein the displayed options include an advertisement marked with a machine-readable identifying code.

15. A computer-implemented vending method in accordance with claim 1, further comprising:

providing for communication between the first consumer and a remotely disposed product specialist concurrent with consideration by the consumer of cosmetic product options.

16. A computer-implemented vending method in accordance with claim 15, wherein providing for communication includes employing a computer communications link.

17. A computer-implemented vending method in accordance with claim 15, further comprising compensating the product specialist at least in part based on a retail order of the first consumer.

18. A computer-implemented vending method in accordance with claim 1, further comprising:
providing for communication between the first consumer and a remotely disposed second consumer concurrent with consideration by the second consumer of cosmetic product options.

19. A computer-implemented vending method in accordance with claim 18, further comprising compensating the first consumer at least in part based on the retail order of the second consumer.

20. A computer-implemented vending method in accordance with claim 1, further comprising:
providing the first consumer with video-based tutorial content concurrently with consideration by the first consumer of cosmetic product options.

21. A computer-implemented vending method in accordance with claim 20, wherein providing video-based tutorial content includes generating a composite image of the face of the first consumer with renditions of the cosmetic product options.

* * * * *